US012795763B2

(12) United States Patent
Xie

(10) Patent No.: US 12,795,763 B2
(45) Date of Patent: Nov. 10, 2026

(54) INTER-SYSTEM PING-PONG SUPPRESSION METHOD, APPARATUS, TERMINAL AND STORAGE MEDIUM

(71) Applicant: GUANGDONG OPPO MOBILE TELECOMMUNICATIONS CORP., LTD., Dongguan (CN)

(72) Inventor: Gui Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 384 days.

(21) Appl. No.: 18/188,115

(22) Filed: Mar. 22, 2023

(65) Prior Publication Data

US 2023/0224992 A1 Jul. 13, 2023

Related U.S. Application Data

(63) Continuation of application No. PCT/CN2021/107666, filed on Jul. 21, 2021.

(30) Foreign Application Priority Data

Sep. 27, 2020 (CN) ......................... 202011035613.0

(51) Int. Cl.
*H04W 76/16* (2018.01)
*H04W 8/22* (2009.01)
*H04W 60/04* (2009.01)

(52) U.S. Cl.
CPC ............. *H04W 76/16* (2018.02); *H04W 8/22* (2013.01); *H04W 60/04* (2013.01)

(58) Field of Classification Search
CPC ....... H04W 76/16; H04W 8/22; H04W 60/04; H04W 36/144; H04W 36/008357;
(Continued)

(56) References Cited

U.S. PATENT DOCUMENTS 10,499,294 B1 * 12/2019 Tayal ............ H04W 36/008375
2003/0119550 A1 6/2003 Rinne et al.
(Continued)

FOREIGN PATENT DOCUMENTS

CN 1968525 5/2007
CN 101662805 3/2010
(Continued)

OTHER PUBLICATIONS

Avoiding inter-system ping-pong due to redirection (Year: 2020).*
(Continued)

*Primary Examiner* — Yemane Mesfin
*Assistant Examiner* — Guoxing Fan
(74) *Attorney, Agent, or Firm* — Hodgson Russ LLP

(57) ABSTRACT

The inter-system ping-pong suppression method, an apparatus, a terminal device and a storage medium are provided. The method comprises: determining a target network standard in at least two network standards when the terminal device is in inter-system ping-pong state, wherein the inter-system ping-pong state refers to a state that the terminal device repeatedly switches between cells of at least two network standards; closing the network capability of the terminal device in other network standards, wherein the other network standards are the network standards other than the target network standard among at least two network standards.

19 Claims, 6 Drawing Sheets

(58) Field of Classification Search
CPC ........... H04W 36/249; H04W 36/0055; H04W 36/14; H04W 36/165; Y02D 30/70
See application file for complete search history.

(56) References Cited

U.S. PATENT DOCUMENTS

| | | | | |
|---|---|---|---|---|
| 2008/0280604 | A1* | 11/2008 | Ore | H04W 48/10 455/424 |
| 2010/0240356 | A1* | 9/2010 | Lee | H04W 48/20 455/422.1 |
| 2013/0344902 | A1* | 12/2013 | Cili | H04W 48/16 455/456.6 |
| 2014/0086050 | A1* | 3/2014 | Swann | H04W 72/54 370/235 |
| 2014/0155065 | A1* | 6/2014 | Centonza | H04W 36/0022 455/436 |
| 2014/0220980 | A1* | 8/2014 | Teyeb | H04W 88/10 455/437 |
| 2015/0043529 | A1* | 2/2015 | Kang | H04W 36/1443 370/331 |
| 2015/0172982 | A1* | 6/2015 | Park | H04W 36/38 370/332 |
| 2015/0264603 | A1* | 9/2015 | Yang | H04W 36/24 455/436 |
| 2015/0358868 | A1* | 12/2015 | Wegmann | H04W 36/008375 455/436 |
| 2019/0150060 | A1* | 5/2019 | Lovlekar | H04W 52/0254 455/418 |
| 2019/0327702 | A1* | 10/2019 | Wang | H04W 76/16 |
| 2020/0163144 | A1* | 5/2020 | Ryoo | H04L 47/82 |
| 2021/0022061 | A1* | 1/2021 | Chou | H04W 36/22 |
| 2021/0321477 | A1* | 10/2021 | Niemi | H04W 76/18 |
| 2022/0312307 | A1* | 9/2022 | Koshta | H04W 60/06 |
| 2023/0031604 | A1* | 2/2023 | Wang | H04W 24/10 |

FOREIGN PATENT DOCUMENTS

| | | |
|---|---|---|
| CN | 101795477 | 8/2010 |
| CN | 102137455 | 7/2011 |
| CN | 103916921 | 7/2014 |
| CN | 103313316 | 5/2016 |
| CN | 105554830 | 5/2016 |
| CN | 105873145 | 8/2016 |
| CN | 108632923 | 10/2018 |
| CN | 108934047 | 12/2018 |
| CN | 104471980 | 5/2019 |
| CN | 109842909 | 6/2019 |
| CN | 110582103 | 12/2019 |
| CN | 110831099 | 2/2020 |
| WO | 2014146500 | 9/2014 |

OTHER PUBLICATIONS

TS38.331_measurement (Year: 2019).*
RFC4068 (Year: 2005).*
RFC7695 (Year: 2015).*
CNIPA, First Office Action for CN Application No. 202211222204.0, Jan. 6, 2025.
Mediatek Inc., "Avoiding inter-system ping-pong due to redirection," 3GPP TSG-CT WG1 Meeting #125-e, C1-205168, Aug. 2020.
CNIPA, First Office Action for CN Application No. 202011035613.0, Feb. 15, 2022.
CNIPA, Notification to Grant Patent Right for Invention for CN Application No. 202011035613.0, Jul. 26, 2022.
WIPO, International Search Report and Written Opinion for International Application No. PCT/CN2021/107666, Sep. 29, 2021.
EPO, Extended European Search Report for EP Application No. 21870995.4, Jan. 23, 2024.
CNIPA, Second Office Action for CN Application No. 202211222204.0, May 8, 2025.

* cited by examiner

INTER-SYSTEM PING-PONG SUPPRESSION METHOD, APPARATUS, TERMINAL AND STORAGE MEDIUM

CROSS-REFERENCE TO RELATED APPLICATION(S)

This application is a continuation of International Application No. PCT/CN2021/107666, filed Jul. 21, 2021, which claims priority to Chinese Patent Application No. 202011035613.0, filed Sep. 27, 2020, the entire disclosures of which are incorporated herein by reference.

TECHNICAL FIELD

Embodiments of this application relate to the technical field of communication, and in particular, to an inter-system ping-pong suppression method, apparatus, terminal and storage medium.

BACKGROUND

A 5G network can be deployed as a Stand Alone (SA) network, meaning that the control plane and user plane are deployed independently (5G is capable of carrying control signaling and user plane data independently). To achieve this, it is necessary to build new base stations and core networks for end-to-end 5G deployment, which are not dependent on existing 4G infrastructure.

In the prior art, when a terminal device has SA capability, it may reselect the cell when in the idle state or switch in the connected state of the network. However, if the network parameter configuration is poor, the terminal device can get stuck in a state of inter-system ping-pong—switching between 4G and 5G, which can negatively impact the network quality of the terminal equipment, ultimately leading to poor performance and hindering normal usage.

SUMMARY

The embodiments of the application provide an inter-system ping-pong suppression method, apparatus, terminal and storage medium. The technical scheme is as follows.

According to a first embodiment, an inter-system ping-pong suppression method, applied to a terminal device, is provided. The method can comprise the following steps:

- determining a target network standard in at least two network standards when the terminal device is in an inter-system ping-pong state, wherein the inter-system ping-pong state refers to state that the terminal device repeatedly switches between cells of at least two network standards; and closing the network capability of the terminal device in other network standards, which are at least two network standards other than the target network standard.

In another embodiment, an apparatus for inter-system ping-pong suppression, applied to a terminal device, is provided. The device can comprise:

- a determining module, configured to determine a target network standard in at least two network standards when the terminal device is in inter-system ping-pong state, wherein the inter-system ping-pong state refers to a state that the terminal device repeatedly switches between cells of at least two network standards; and a closing module, configured to close the network capability of the terminal device in other network standards, wherein the other network standards are the network standards other than the target network standard among at least two network standards.

According to another embodiment, a terminal device comprising a processor and a memory is provided. The memory stores at least one instruction that, when executed by the processor, implements the inter-system ping-pong suppression method as described above.

In another embodiment, a computer-readable storage medium, which stores at least one instruction, is provided. Execution of the at least one instruction by a processor causes the processor to implement the inter-system ping-pong suppression method as described above.

In an additional embodiment, a computer program product or computer program, which comprises computer instructions stored in a computer-readable storage medium, is provided. The processor of the computer device reads the computer instruction from the computer-readable storage medium, and the processor executes the computer instruction, so that the computer device executes the inter-system ping-pong suppression method as described above.

DETAILED DESCRIPTION

To clarify the purpose, technical scheme, and advantages of this application, a detailed description of embodiments are described, along with accompanying drawings.

In this application, "multiple" refers to two or more. "and/or", which describes the relationship of related objects, means that there can be three kinds of relationships, for example, A and/or B, which can mean that A exists alone, A and B exist together, and B exists alone. The character "/" generally indicates that the context object is an OR relationship.

Figure 1:
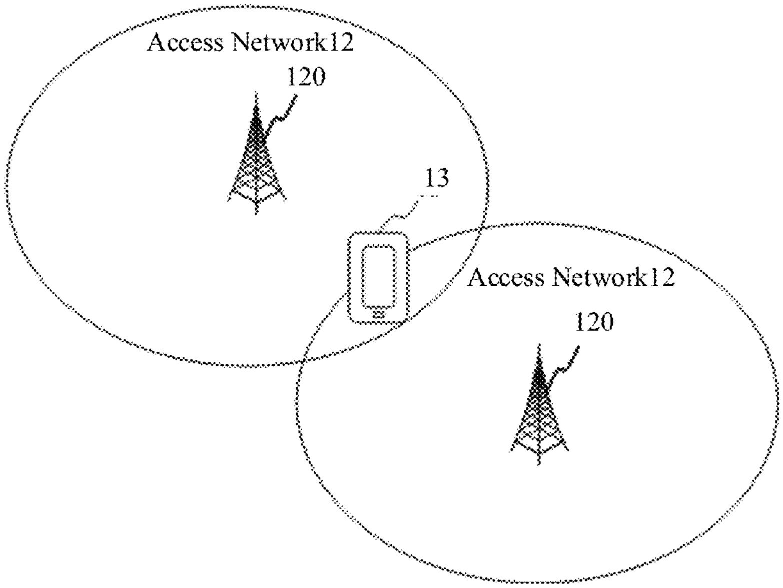
FIG. 1 shows a block diagram of a communication system provided by an exemplary embodiment of the application.

FIG. 1 shows a block diagram of a communication system according to an exemplary embodiment of this application, which may include an access network 12 and a terminal device 13.

The access network 12 includes several network devices 120. The network device 120 may be a base station, which is a device deployed in an access network to provide wireless communication functions for terminal devices. The base station can include various forms of macro base station, micro base stations, relay stations, access points and so on. In systems with different wireless access technologies, the names of devices with base station functions may be different, for example, in Long Term Evolution (LTE) systems, they are called evolved Node B (eNodeB) or eNB; In the 5G NR-U system, they are called gNodeB or gNB. With the evolution of communication technology, the description of "base station" may change. For convenience of description, the above-mentioned devices providing wireless communication function for a terminal device 13 are collectively referred to as "network devices."

The terminal device 13 may include various handheld devices, vehicle devices, wearable devices, computing devices or other processing devices connected to a wireless modem, as well as various forms of user device, mobile station (MS), terminal devices, and so on. For the convenience of description, the above-mentioned devices are collectively referred to as "terminal devices." The network device 120 and the terminal device 13 communicate with each other through some air interface technology, such as Uu interface.

The inter-system ping-pong suppression method provided by an embodiment of this application can be used for the terminal device 13 in the communication system shown in FIG. 1. The method provided by embodiments of this application can be used for 3G system, 4G system, 5G systems, or even further evolved communication systems.

Figure 2:
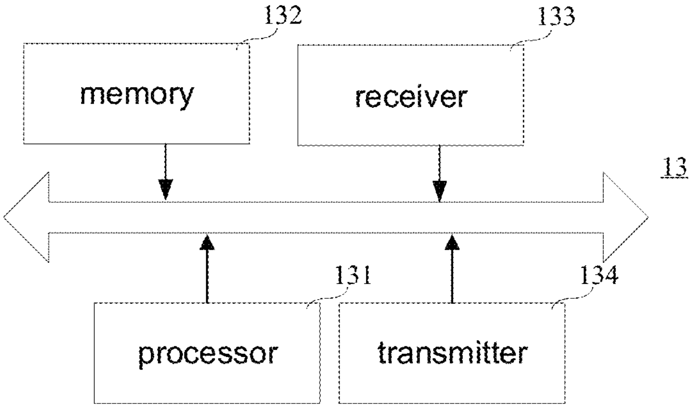
FIG. 2 shows a structural block diagram of a terminal device provided by an exemplary embodiment of the application.

FIG. 2 shows a structural block diagram of a terminal device provided by an exemplary embodiment of the application. The terminal device 13 in this application may include one or more of the following components: a processor 131, a memory 132, a receiver 133, and a transmitter 134.

The processor 131 may include one or more processing cores. The processor 131 can connect various parts of the terminal device 13 via various interfaces and lines, execute various functions, and process data of the terminal device 13 by running or executing instructions, programs, code sets or instruction sets stored in the memory 132 and calling data stored in the memory 132. Alternatively, the processor 131 may be implemented in at least one hardware form of digital signal processing (DSP), field-programmable gate array (FPGA) and programmable logic array (PLA). The processor 131 may be integrated with one or more combinations of central processing unit (CPU), graphics processing unit (GPU), neural-network processing unit (NPU) and modem. The CPU can primarily handle operations of an operating system, user interface, and application programs. The GPU can be used to render display content on a screen, such as a touch screen. The NPU can perform artificial intelligence (AI) functions. Modems can be used to process wireless communication. It should be understood that a modem may or may not be integrated into a single chip with processor 131.

The memory 132 may include a random access memory (RAM) or a read-only memory (ROM). Optionally, the memory 132 includes a non-transitory computer-readable storage medium. The memory 132 may be used to store instructions, programs, codes, code sets or instruction sets. The memory 132 may include a storage program area and a storage data area, where the storage program area can store instructions for implementing an operating system, instructions for at least one function (such as a touch function, a sound playing function, an image playing function, etc.), and instructions for implementing various method embodiments, described below. The storage data area may store data (such as audio data, phone book) and the like created according to the use of the terminal device 13.

The receiver 133 and the transmitter 134 can be realized as a communication component, which can be a communication chip.

Optionally, the terminal device 13 may further include a display screen. A display screen is a display component for displaying a user interface. Optionally, the display screen also has a touch function, through which a user can touch the display screen with any suitable object, such as fingers and a touch pen.

As understood by those skilled in the art, the structure of the terminal device 13 shown in the above drawings should not be read as limiting in any way. According to the present disclosure, the terminal device 13 may include more or less components than what is shown, or combine some components, or have different component arrangements. For example, a terminal device 13 may or may not include camera components, radio frequency circuits, input units, sensors (such as acceleration sensors, angular velocity sensors, light sensors, etc.), audio circuits, wireless fidelity (Wi-Fi) module, power supply, Bluetooth module, and any number of other components not described herein.

Figure 3:
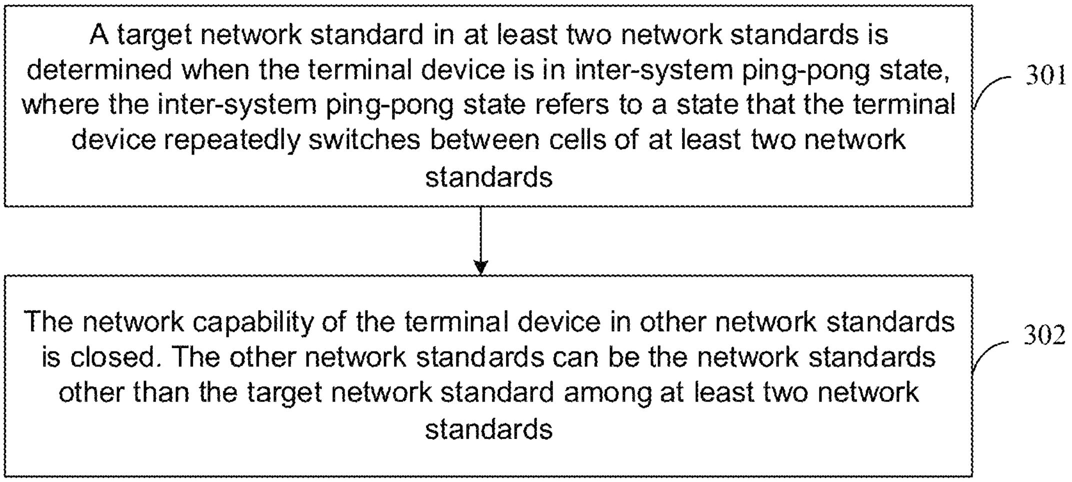
FIG. 3 shows a flowchart of an inter-system ping-pong suppression method provided by an exemplary embodiment of the application.

FIG. 3 shows a flowchart of an inter-system ping-pong suppression method provided by an exemplary embodiment of the application. This embodiment is explained by taking the method as an example, which is executed by the terminal device 13 shown in FIG. 1. The process can include the following steps.

In step 301, a target network standard in at least two network standards is determined when the terminal device is in inter-system ping-pong state, where the inter-system ping-pong state refers to a state that the terminal device repeatedly switches between cells of at least two network standards.

In one possible embodiment, when the terminal device is in cell reselection of an idle state or network switching in a connected state, the resident cell of the terminal device is switched. When the cell is switched, the terminal device records the network standard adopted by the switched cell.

Schematically, the terminal device resides in the A network standard cell, and when switching to the B network standard cell, the network standard adopted by the cell after switching is recorded as B. When switching to the A network standard cell again, the record is updated, and the network standards recorded at this time are B and A.

The inter-system ping-pong state is a state that the terminal device repeatedly switches between cells of at least two network standards. That is, the resident cell of terminal device is constantly changing, and the adopted network standard is different. For example, switching back and forth between 4G and 5G cells is an inter-system ping-pong state.

In one possible implementation, the terminal device obtains the network standard sequence within a predetermined time, determines the handover situation of the terminal device in the resident cell according to the recorded network standard sequence, and further identifies whether it is in an inter-system ping-pong state based on the handover situation of the resident cell. Optionally, when identifying whether the terminal device is in an inter-system ping-pong state based on the switching situation of the resident cell, the terminal device can be identified based on recording the switching times of the network standard, and the similarities and differences of the adjacent network standards in the network standard sequence. When the switching times reach the threshold number and the adjacent network standards differ, it can be determined that the terminal device is in an inter-system ping-pong state.

According to embodiments of the present disclosure, the network standard sequence can be composed of the recorded network standard adopted by the switched cell after each handover of the resident cell of the terminal device.

In the aforementioned steps, a predetermined duration of 30 seconds and a threshold of 5 network standard switches can be set. If the terminal device switches between network standards B and A, with a sequence of B-A-B-A-B, within 30 seconds, and if the cell where the terminal device is located changes five times during that duration, and the network standard after each switch is different from the one before it, then it can be inferred that the terminal device is experiencing inter-system ping-pong (i.e. is an inter-system ping-pong state).

In an embodiment of this application, when the terminal device is in the inter-system ping-pong state, a target network standard can be determined among at least two network standards, for example, the target network standard can be determined as the B network standard.

In step 302, the network capability of the terminal device in other network standards is closed. The other network standards can be the network standards other than the target network standard among at least two network standards.

In one possible embodiment, when the resident cell of the terminal device switches back and forth between cells with at least two network standards, the network capability of the terminal device in other network standards is closed after the target network standard is determined. Other network standards can refer to the network standards other than the target network standard among the at least two network standards. When the network capability of the terminal device in the other network standards is closed, the terminal device will continue to reside in the cell adopting the target network standard, and will not switch to the cell of other network standards—thus terminating the inter-system ping-pong state.

Schematically, if the target network standard is B, the network capability of the terminal device in the A network standard will be closed, and the terminal device will no longer switch to the cell adopting the A network standard. Consequently, the ping-pong state of the terminal device between the A and B network standards will terminate.

It should be noted that the above embodiment only takes the repeated switches of the terminal device between cells adopting two different network standards as an example. In other possible embodiments, when the terminal device repeatedly switches between cells adopting at least three different network standards, the terminal can determine one of the network standards as the target network standard and closed the network capabilities of the remaining at least two network standards, which is not limited in this embodiment.

In summary, one embodiment of the present disclosure addresses the issue of a terminal device repeatedly switching between at least two network standards by determining the target network standard when the cell where the device resides is in an inter-system ping-pong state. This can involve closing the network capability of the terminal device in other network standards, except for the target network standard, within the at least two network standards. This approach can help improve the network performance of the terminal device by preventing it from constantly switching between cells that adopt different network standards.

Optionally, closing the network capability of the terminal device in other network standards can include:

starting a timer when the terminal device resides in the target cell, and closing the network capability in the other network standards. The method can further include restoring the network capability in the other network standards when the timer reaches a timer duration.

Optionally, starting the timer can include updating the number of inter-system ping-pong state rounds. The number of inter-system ping-pong state rounds can be used to represent the occurrences of inter-system ping-pong states. According to the number of inter-system ping-pong state rounds, and starting the timer, the time of the timer cam be positively correlated with the number of rounds of inter-system ping-pong states.

Optionally, after closing the network capability of other network standards, network capability can be restored using alternative network standards when the signal strength of the target cell falls below the signal strength threshold or the terminal device is displaced beyond the displacement threshold during the timer duration.

Optionally, after closing the network capability in other network standards, the identifier of target cell can be added to a forbidden list. The forbidden list can be used to store cell identifiers of cells having an inter-system ping-pong state problem. The network capability in the other network standards can be restored when the resident cell of the terminal device is switched and the cell identifier of the switched cell does not belong to the forbidden list.

Optionally, the identifier of the target cell can be removed from the forbidden list when a removal condition is met. The removal condition can include at least one of: the terminal device accessing the network again; and the adding time of the target cell identifier reaching a time threshold.

Optionally, before determining a target network standard in at least two network standards when the terminal device is in inter-system ping-pong state, the cell identifier of the switched cell can be obtained when the resident cell of the terminal device is switched. The network standard adopted by the switched cell can be recorded when the identifier of the switched cell does not belong to the forbidden list, and the forbidden list contains the cell identifier of the cell having an inter-system ping-pong state problem.

Optionally, the terminal device turns on the SA capability of 5G.

Optionally, determining a target network standard in at least two network standards when the terminal device is in inter-system ping-pong state includes:

determining that the terminal device is in the inter-system ping-pong state when the terminal device repeatedly switches between cells of a 5G network and a 4G network, and determining the target network standard is 4G.

Optionally, closing the network capability of the terminal device in other network standards includes:

closing the 5G SA capability when the terminal device resides in a 4G cell.

Optionally, after closing the 5G SA capability, the method can also include:

sending a tracking area updating (TAU) request to a network device. The value of a preset field in the TAU request is a first numerical value, and the first numerical value can be used to indicate the close of 5G SA capability of the terminal device. The network device can used to update the network capability of the terminal device according to the TAU request.

To prevent the terminal device from being unable to connect to networks of other standards after being in an inter-system ping-pong state for an extended period, this embodiment includes setting a timer after the terminal device enters a cell that adopts the target network standard.

During this time, the network capability in other standards is closed. Once the timer expires, the network capability in other standards can be automatically restored, allowing the device to subsequently connect to other networks.

Since the resident cell of the terminal device can be frequently switched, a forbidden list can be provided in order to improve the efficiency of detecting whether the terminal device is in an inter-system ping-pong state after switching. The forbidden list can include the identification of the cell having the inter-system ping-pong state problem, which can make it easier and faster to detect whether the cell where the terminal device resides has the inter-system ping-pong problem.

Figure 4:
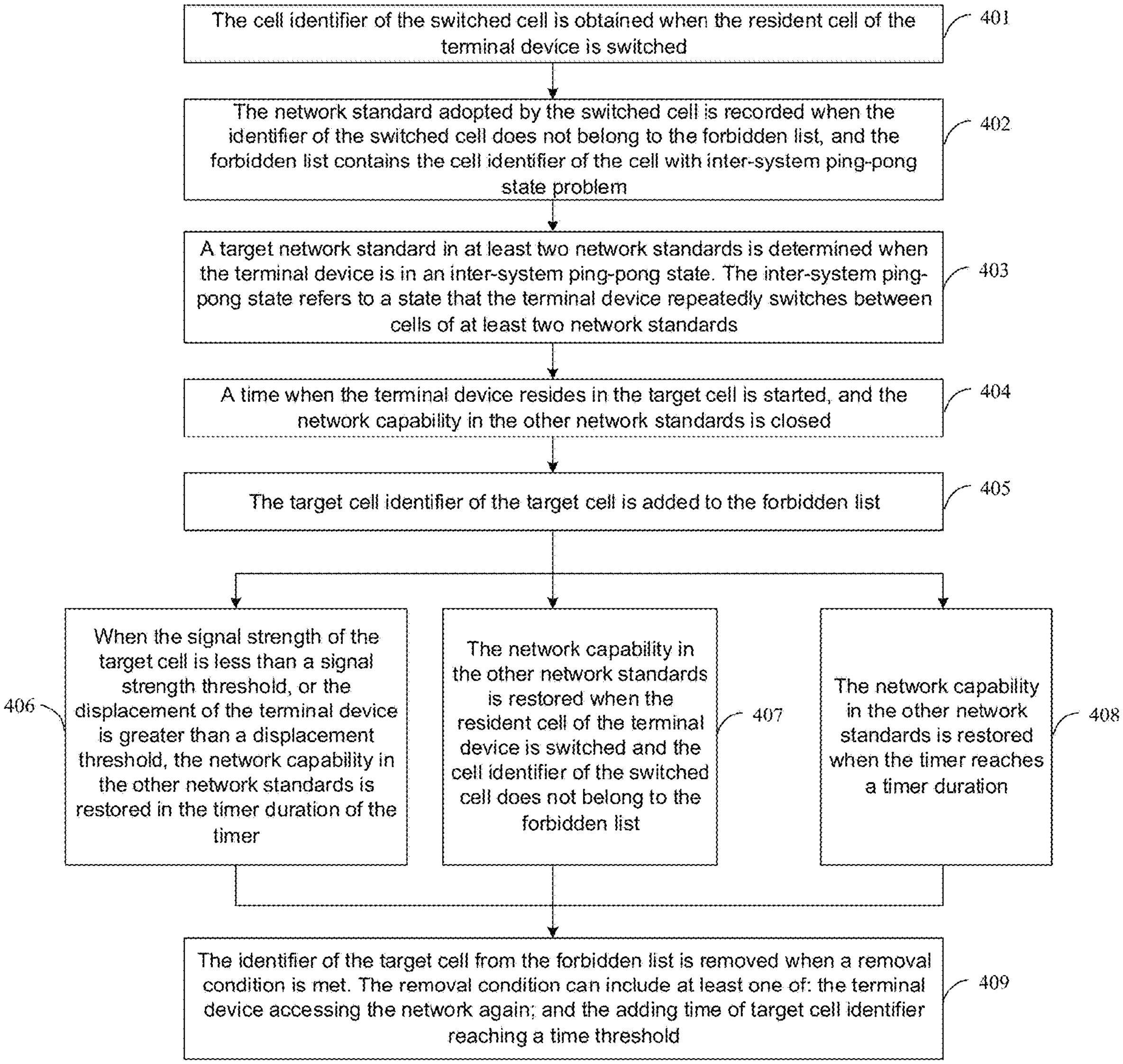
FIG. 4 shows a flowchart of an inter-system ping-pong suppression method provided by another exemplary embodiment of the application.

FIG. 4 is a flowchart of an embodiment of an inter-system ping-pong suppression method according to the present disclosure. This embodiment is explained by taking the method as an example, which executed by the terminal device 13 shown in FIG. 1. The process can include the following steps.

In step 401, the cell identifier of the switched cell is obtained when the resident cell of the terminal device is switched.

Because some cells may be prone to inter-system ping-pong problems, it may be necessary to obtain the cell identifier of the new cell after a switch occurs to quickly identify any inter-system ping-pong problems in the current cell of the terminal device. This identifier can then be used to determine if there are any inter-system ping-pong issues in the resident cell.

In step 402, the network standard adopted by the switched cell is recorded when the identifier of the switched cell does not belong to the forbidden list, and the forbidden list contains the cell identifier of the cell with inter-system ping-pong state problem.

In one possible embodiment, the terminal device stores a forbidden list in advance, and the forbidden list contains cell identifiers of cells with inter-system ping-pong state problems. The cells in the forbidden list are cells where the terminal device has resided in history and the problem of inter-system ping-pong was previously detected.

When the identifier of the cell after handover is obtained, it can be detected whether the cell identifier belongs to the forbidden list. If it does not belong to the forbidden list, it indicates that the current cell after handover does not belong to the cell that has historically resided and has the inter-system ping-pong problem. It may be necessary to further determine whether the terminal device is in an inter-system ping-pong state by recording the network standard sequence adopted by the cell after handover.

Optionally, if the cell identifier is in the forbidden list, it can indicate that the terminal device has been in that cell before and experienced inter-system ping-pong issues. Consequently, there may still be inter-system ping-pong problems if the terminal device returns to that cell. To address this, the terminal can immediately determine the target network standard and disable the network capability of the terminal device in other network standards as soon as it switches to the cell.

In step 403, a target network standard in at least two network standards is determined when the terminal device is in an inter-system ping-pong state. The inter-system ping-pong state refers to a state that the terminal device repeatedly switches between cells of at least two network standards.

For the sake of brevity, the details of this step will not be discussed in detail as they can correspond to step 301, described above.

In step 404, a time when the terminal device resides in the target cell is started, and the network capability in the other network standards is closed.

In order to avoid that the network capability of the terminal device in other network standards is continuously closed, the present embodiment can include a timer. When the terminal device resides in the target cell, the timer is started, and the target cell is the cell adopting the target network standard.

In one possible implementation, the timer duration can be a preset duration, for example, the preset duration can be set to 5 minutes.

However, if the ping-pong status of different systems continues, the inter-system ping-pong problem can still occur after restoring the network capability of the terminal device in other network standards. Therefore, in order to prevent the terminal device from repeatedly closing and restoring the network capability of other network standards when the inter-system ping-pong state persists, the terminal device can set a dynamically increasing duration for the timer according to the occurrence times of the inter-system ping-pong state. This step may include the following sub-steps.

In a first sub-step, the number of inter-system ping-pong state rounds can be updated. The number of inter-system ping-pong state rounds can be used to represent the occurrences of inter-system ping-pong states.

In one possible embodiment, the terminal device stores and maintains the number of rounds of inter-system ping-pong states. The terminal device can update the number of rounds with an inter-system ping-pong state every time the inter-system ping-pong state is determined. For example, add one to the number of inter-system ping-pong rounds. It should be noted that the number of rounds of inter-system ping-pong state refers to the number of times when the terminal device resides in the target cell. When the terminal device resides in other cells, the appearance of inter-system ping-pong state will not trigger an update of inter-system ping-pong state rounds.

In a second sub-step, the timer duration of the timer is set according to the number of inter-system ping-pong state rounds, and the timer is started. The timer duration can be positively correlated with the number of inter-system ping-pong state rounds.

One possible implementation for determining the timer duration based on inter-system ping-pong state rounds involves the terminal device first calculating a candidate duration based on these rounds, and then selecting the minimum value between the candidate duration and the maximum duration limit as the timer duration. The candidate duration can increase with the rounds of inter-system ping-pong states—i.e., as these rounds increase, the terminal device's network capacity in other network standards will remain closed for a longer period of time.

In a schematic example, the duration of the candidate timer is exponentially related to the number of rounds of the inter-system ping-pong state. For example, the candidate timer duration=$2^{round}$ where "round" is the number of rounds of the inter-system ping-pong state.

For example, when the number of rounds of the inter-system ping-pong state is 1, the candidate forbidden duration can be 2 minutes. When the number of rounds of the inter-system ping-pong state is 3, the duration of the candidate timer can be 8 minutes.

To prevent an infinite increase in timer duration that could compromise the terminal device's network capabilities, an upper limit can be set on the duration of the timer. When the candidate timer duration is less than the upper limit of a timer duration, the terminal device determines the candidate timer duration as the timer duration; and when the candidate timer duration is greater than the timer duration upper limit, the terminal device determines the timer duration upper limit as the timer duration.

For example, when the upper limit of timer duration is 360 minutes, the maxiumum duration determined according to the number of inter-system ping-pong state rounds can be expressed as min($2^{round}$, 360).

Of course, the terminal device can also determine the incremental candidate timer duration in other ways, and the embodiment of this application only takes the above-mentioned way as an example for schematic explanation, but does not limit it.

In one possible implementation, the network capability in other network standards can be closed while the timer is started.

In step 405, the target cell identifier of the target cell is added to the forbidden list.

In order to make the terminal device subsequently reside in the target cell again, it can be judged that there may be an inter-system ping-pong problem based on the forbidden list, so as to close the network capacity in other network standards in time. In one possible implementation, when it is detected that the terminal device is in an inter-system ping-pong state and resides in the target cell, the terminal adds the target cell identifier of the target cell to the forbidden list, thereby indicating that the target cell has an inter-system ping-pong problem.

It should be noted that this step can be executed synchronously with step 404 or sequentially, and this embodiment of the application is not limited to any particular approach.

In step 406, when the signal strength of the target cell is less than a signal strength threshold, or the displacement of the terminal device is greater than a displacement threshold, the network capability in the other network standards is restored in the timer duration of the timer.

During the timer operation, the terminal device may be displaced. During the displacement, the signal strength of the target cell will change, and the inter-system ping-pong state may also change. In this embodiment, it can also be determined whether it is necessary to restore, in advance, the network capability of the terminal device in other network standards within the timer duration according to the displacement amplitude of the terminal device and the change of the signal strength of the target cell.

In one possible embodiment, the terminal device continuously measures the cell signal strength, for example, the reference signal receiving power (RSRP), during the process of residing in the target cell. When the cell signal strength of the target cell is less than the signal strength threshold, it can indicate a drop in signal quality of the target cell. In such cases, if the network capacity of other network standards is continuously closed, the terminal device may be out of service, so it is necessary to restore the network capacity of other network standards in time to prevent the terminal device from dropping off the network and affecting its normal operation. For example, the network capability of the terminal device in other network standards can be restored when the RSRP of the current serving cell falls below −115 dBm.

In another possible embodiment, the terminal device obtains the displacement amplitude during the process of residing in the target cell. Optionally, the displacement amplitude can be obtained by the terminal device through a positioning component (such as a Global Positioning System, GPS)) or calculated by the terminal according to the sensor data of a sensor (such as an acceleration sensor or a pedometer). When the displacement of the terminal device is greater than the displacement threshold, the signal strength of the target cell will change, and correspondingly, the inter-system ping-pong problem may disappear. Subsequently, the network capacity of other network standards can then be restored. It should be noted that the displacement threshold is smaller than the coverage of the target cell. For example, the coverage of the target cell is 800 m, and the displacement threshold can be 500 m. When the displacement of the terminal device is greater than 500 m, the network capability in other network standards can be restored.

In step 407, the network capability in the other network standards is restored when the resident cell of the terminal device is switched and the cell identifier of the switched cell does not belong to the forbidden list.

During the timer operation, the displacement of the terminal device may also cause the switching of the cell where the terminal device resides. When the terminal device resides in other cells, the inter-system ping-pong may no longer exist, and it is necessary to restore the network capability of the terminal device in other network standards.

In one possible implementation, if the resident cell of the terminal device is switched during the operation of the timer, the cell identifier of the switched cell is obtained, and whether it belongs to the forbidden list is judged according to the cell identifier. If the cell identifier is not on the forbidden list, the network capability in other network standards can be restored, so that the terminal device can use the network in other network standards after the switching. Optionally, in this step, the cell after handover refers to another cell adopting the target network standard.

In step 408, the network capability in the other network standards is restored when the timer reaches a timer duration.

In one possible implementation, the terminal device detects that the timer duration has expired. If the network capability of the terminal device in other network standards is still in the closed state, the network capability of the terminal device in other network standards can be restored, so that the terminal device can subsequently continue to connect with the networks in other network standards.

In step 409, the identifier of the target cell from the forbidden list is removed when a removal condition is met. The removal condition can include at least one of: the terminal device accessing the network again; and the adding time of target cell identifier reaching a time threshold.

In the above step, the target cell identifier of the target cell is added to the forbidden list. However, the terminal device may not be continuously in the inter-system ping-pong state in the target cell. Consequently, it may be necessary to remove the target cell identifier from the forbidden list promptly to ensure that the device can connect to other network standards when it later resides in the target cell.

In one possible implementation, when the removal condition is met, the target cell identifier is removed from the forbidden list. The removal conditions include at least one of the following.

1. Reconnect to the Network.

The ping-pong state of different systems can be caused by the incorrect configuration of network parameters. When the terminal device reconnects to the network, the network parameters can be reconfigured, which may not produce the inter-system ping-pong state. Therefore, in one possible implementation, the target cell identifier is removed from the forbidden list when the terminal device reconnects to the network.

Optionally, the terminal device can reconnect to the network by turning on/off, switching airplane mode on/off, or connecting or removing the SIM card (all of which need to be reconnected to the network). That is, when detecting the terminal device is switched on/off, airplane mode is turned on/off, the SIM card is or connected or removed, the terminal device removes the target cell identifier from the forbidden list.

2. The Adding Duration of the Target Cell Identifier Reaches the Duration Threshold.

After the inter-system ping-pong state, the network parameters may change for a period of time, and the reconfigured network parameters may not lead to the inter-system ping-pong state. Therefore, in one possible implementation, a duration threshold can be set for the duration for which the target cell identifier is added to the forbidden list. When the duration threshold is reached, the target cell identifier is removed from the forbidden list. For example, the duration threshold may be 12 hours.

In this embodiment, the timer is set to control the duration of closing the network capability of the terminal device in other network standards, so that the terminal device can still use the network of other network standards after ensuring that the inter-system ping-pong state disappears, thus ensuring good network performance.

Additionally in this embodiment, a forbidden list can be created for the cell where the inter-system ping-pong problem occurs. When the terminal device is unable to connect to the network due to differences in network standards, the forbidden list can enable an easy assessment of whether the inter-system ping-pong state is likely to occur. If the device is not on the forbidden list, its network capability can be restored, ensuring optimal network performance of the terminal device in other cells.

Figure 5:
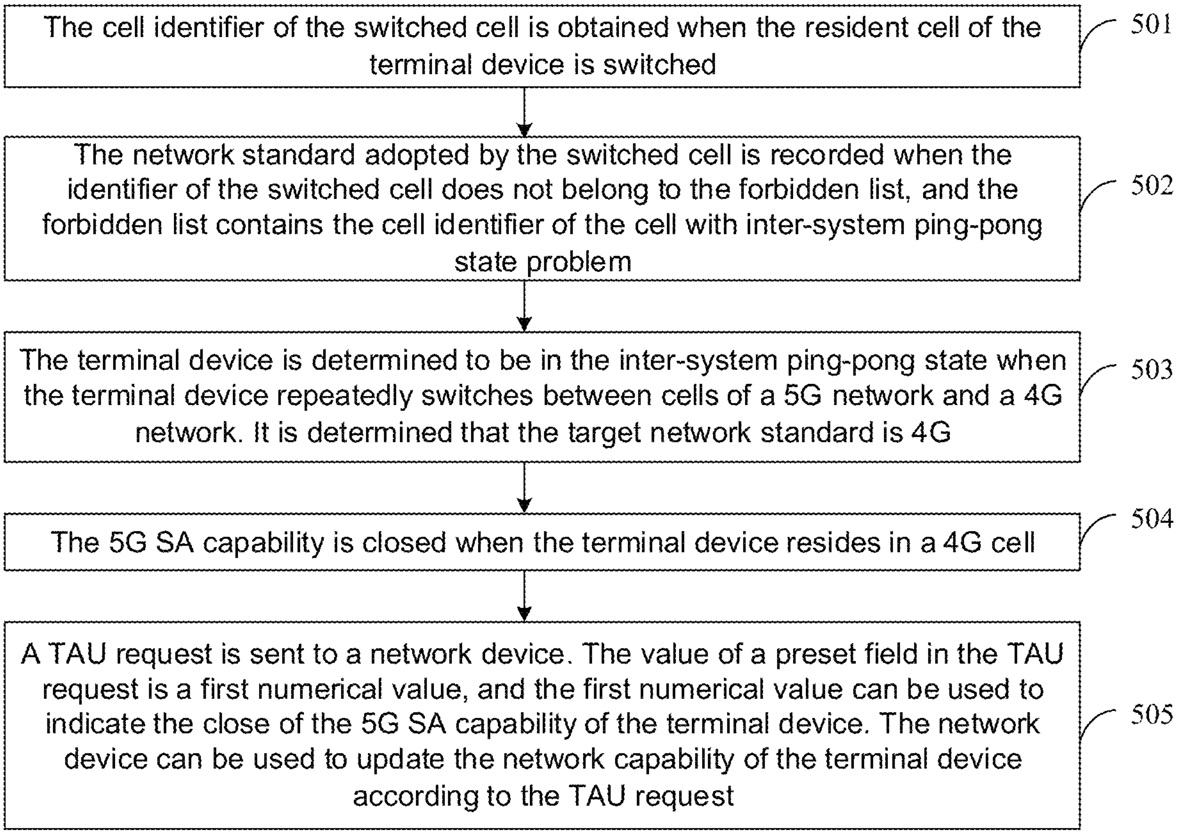
FIG. 5 shows a flowchart of an inter-system ping-pong suppression method provided by another exemplary embodiment of the application.

After the terminal device registers for 5G SA, and when cell handover or cell reselection occurs, the network parameters of 5G cell and 4G cell may both meet the handover conditions due to incorrect configuration of network parameters. This may also lead to the occurrence of an inter-system ping-pong state. FIG. 5 shows a flowchart of an exemplary inter-system ping-pong suppression method of 4G and 5G. This embodiment is explained by taking the method as an example, which is executed by the terminal device 13 shown in FIG. 1. The process includes the following steps.

In step 501, the cell identifier of the switched cell is obtained when the resident cell of the terminal device is switched.

In step 502, the network standard adopted by the switched cell is recorded when the identifier of the switched cell does not belong to the forbidden list, and the forbidden list contains the cell identifier of the cell with inter-system ping-pong state problem.

As the implementation of steps 501 and 502 can correspond to the above steps 401 and 402, the details of this embodiment are not repeated here for the sake of brevity.

In step 503, the terminal device is determined to be in the inter-system ping-pong state when the terminal device repeatedly switches between cells of a 5G network and a 4G network. It is determined that the target network standard is 4G.

In one possible implementation, the network standard sequence recorded by the terminal device alternates between 4G and 5G, indicating that the terminal device repeatedly switched between the 5G cell and the 4G cell. Based upon this recorded sequence, it can be determined that the terminal device is in the inter-system ping-pong state of 4G and 5G. Currently, the deployment of 5G network technology is not yet widespread, and as a result, some services still rely on 4G networks. An example of this is when voice call services may need to switch back to 4G networks and be implemented using voice over long-term evolution (VoLTE). Therefore, when the inter-system ping-pong state is between 4G and 5G, the target network standard is determined to be 4G, so as to avoid determining the target network standard should be 5G, and subsequently closing the capacity of 4G network, which will cause the services to be unable to operate normally.

With the development of technology, services can be carried out independently under the 5G network, and the target network standard can be determined as the 5G network without relying on the 4G network, which is not limited in this embodiment of the application.

In step 504, the 5G SA capability is closed when the terminal device resides in a 4G cell.

After the target network standard is determined to be 4G, and the terminal device resides in a 4G cell, the 5G SA capability of the terminal device is closed, so that the terminal device cannot switch to 5G network. The ping-pong state of 4G and 5G heterogeneous systems can then be terminated.

In step 505, a TAU request is sent to a network device. The value of a preset field in the TAU request is a first numerical value, and the first numerical value can be used to indicate the close of the 5G SA capability of the terminal device. The network device can be used to update the network capability of the terminal device according to the TAU request.

In one possible implementation, when the terminal closes the 5G SA capability, the network capability of the terminal device needs to be updated to the network device. Optionally, the terminal device sends a TAU request to the network device, and sets the value of the preset field as a first value, which indicates that the terminal's 5G SA capability is closed. For example, the network device can be a base station, and the terminal device sends a TAU request to the base station, and sets N1 mode to 0, so as to close the terminal 5G SA capability and update the terminal device's network-side capability synchronously with the base station.

Optionally, when the terminal subsequently recovers the 5G SA capability, it is also necessary to update the network capability of the terminal device to the network device. The terminal device sends a TAU request to the network device, and sets the value of the preset field as a second value, indicating the ability to open the terminal's 5G SA. For example, the network device can be a base station, and the terminal device sends a TAU request to the base station, and sets N1 mode to 1, so as to open the terminal 5G SA capability and update the terminal device's network-side capability synchronously with the base station.

In this embodiment, when the terminal device is in the inter-system ping-pong state between 4G and 5G, and the terminal device is currently connected to a 4G cell, the terminal device's 5G SA capability is disabled. This can ensure that the terminal stays connected to the 4G network, preventing further ping-ponging between networks and improving the overall network performance for the device.

Figure 6:
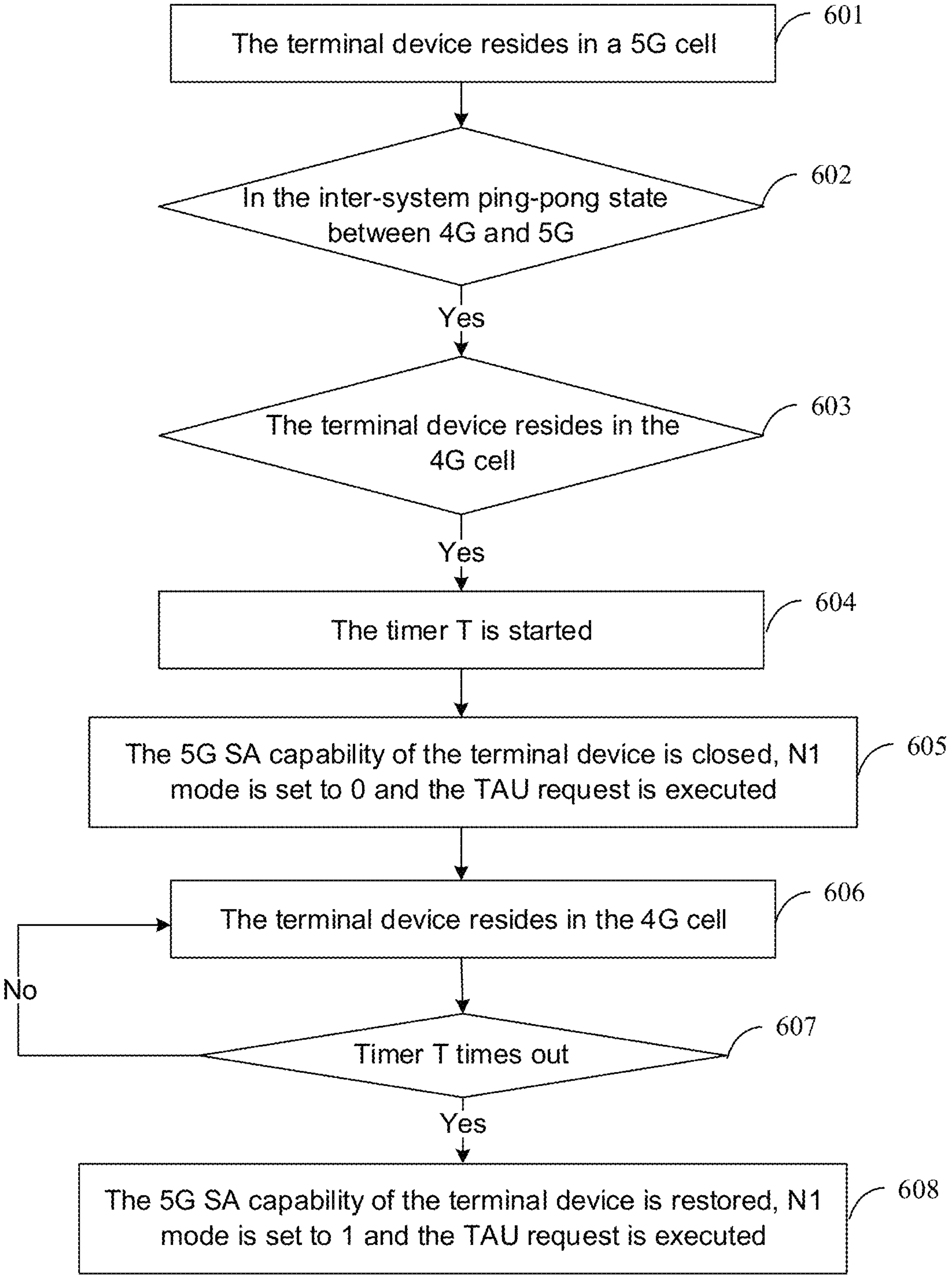
FIG. 6 is a flowchart of an inter-system ping-pong suppression process provided by an exemplary embodiment of the application.

In a schematic example, the inter-system ping-pong suppression process of the terminal device is shown in FIG. 6.

In step 601, the terminal device resides in a 5G cell.

In step 602, the terminal device detects whether it is in the inter-system ping-pong state between 4G and 5G, and if it is in the inter-system ping-pong state, step 603 is executed.

In step 603, the terminal device detects whether it resides in the 4G cell, and if so, step 604 is executed.

In step 604, the timer T is started.

In step 605, the 5G SA capability of the terminal device is closed, N1 mode is set to 0 and the TAU request is executed.

In step 606, the terminal device resides in the 4G cell.

In step 607, it is checked whether the timer times out. If it has timed out, step 608 is executed; and if the timer is still running, step 606 is executed.

In step 608, the 5G SA capability of the terminal device is restored, N1 mode is set to 1 and the TAU request is executed.

Figure 7:
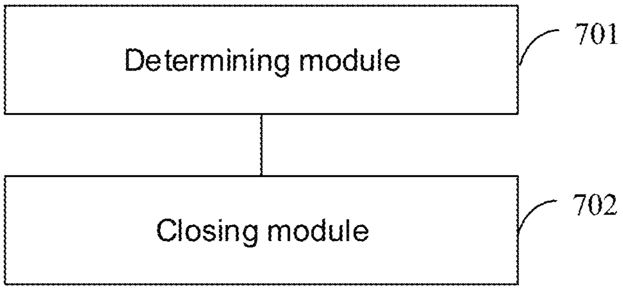
FIG. 7 shows a structural block diagram of an inter-system ping-pong suppression apparatus provided by an embodiment of the application.

FIG. 7 shows a structural block diagram of an inter-system ping-pong suppression apparatus provided by an embodiment of the application. The device can be realized as all, or a part of, the terminal device 13 in FIG. 1 by software, hardware, or a combination of both. The apparatus can comprise the following.

A determining module 701, configured to determine a target network standard in at least two network standards when the terminal device is in inter-system ping-pong state. The inter-system ping-pong state refers to a state that the terminal device repeatedly switches between cells of at least two network standards.

A closing module 702, configured to close the network capability of the terminal device in other network standards. The other network standards are the network standards other than the target network standard among at least two network standards.

Optionally, the closing module 702 can comprise: a starting unit, configured to start a timer when the terminal device resides in the target cell;

and a closing unit, configured to close the network capability in the other network standards.

Optionally, the apparatus can further comprise:

a first restoring module, configured to restore the network capability in the other network standards when the timer reaches a timer duration.

Optionally, the starting unit is used to update a number of inter-system ping-pong state rounds. The number of inter-system ping-pong state rounds can be used to represent the occurrence times of the inter-system ping-pong state. The time duration of the timer can be set according to the number of inter-system ping-pong state rounds. The timer can be started, where the timer duration is positively correlated with the number of inter-system ping-pong state rounds.

Optionally, the apparatus further comprises a second restoring module, configured to restore the network capability in the other network standards in the timer duration of the timer, when the signal strength of the target cell is less than a signal strength threshold, or the displacement of the terminal device is greater than a displacement threshold.

Optionally, the apparatus further comprises an adding module, configured to add the identifier of target cell to a forbidden list. The forbidden list is used for storing cell identifiers of cells with inter-system ping-pong state problem. The apparatus can also include a third restoring module, configured to restore the network capability in the other network standards when the resident cell of the terminal device is switched and the cell identifier of the switched cell does not belong to the forbidden list. A removing module, configured to remove the identifier of the target cell from the forbidden list can also be included. The removal condition can include at least one of: the terminal device accessing the network again; and the adding time of target cell identifier reaching a time threshold.

Optionally, the apparatus can further comprise:

an obtaining module, configured to obtain the cell identifier of the switched cell when the resident cell of the terminal device is switched; and a recording module, configured to record the network standard adopted by the switched cell when the identifier of the switched cell does not belong to the forbidden list, and the forbidden list contains the cell identifier of the cell with inter-system ping-pong state problem.

Optionally, the terminal device turns on the SA capability of 5G, and the determining module is further configured to:

determine the terminal device is in the inter-system ping-pong state when the terminal device repeatedly switches between cells of a 5G network and a 4G network, and determine that the target network standard is 4G.

The closing module 702 can be further configured to close the 5G SA capability when the terminal device resides in a 4G cell.

Optionally, the apparatus further comprises:

a sending module, configured to send a TAU request to a network device. The value of a preset field in the TAU request is a first numerical value, and the first numerical value is used for indicating the close of the 5G SA capability of the terminal device. The network device ca be used to update the network capability of the terminal device according to the TAU request.

In an embodiment of the present disclosure, when the cell where the terminal device resides repeatedly switches between at least two network standards (e.g. the terminal device is in an inter-system ping-pong state), the target network standard can be determined in the at least two network standards. The network capability of the terminal device in other network standards other than the target network standard in the at least two network standards is closed, so that the terminal device is prevented from repeatedly switching between cells adopting different network standards. In this way, the network performance of the terminal device can be improved.

In an embodiment of the present application, the timer is set to control the duration of closing the network capability of the terminal device in other network standards, so that the terminal device can still use the network of other network standards after ensuring that the inter-system ping-pong state disappears. This also can help ensure strong network performance.

In an embodiment of the present application, a forbidden list is created for the cell(s) where the ping-pong problem exists in different systems. If the terminal device resides in other cells during the period of closing the network capability of the terminal device in other network standards, it can be quickly determined whether the inter-system ping-pong state is likely to occur through the forbidden list. If it does not belong to the forbidden list, the network capability of the terminal device can be restored to ensure the network performance of the terminal device in other cells.

The embodiment of this application also provides a computer-readable medium, which stores at least on instruction, and the at least one instruction is loaded and executed by a processor to implement the method for inter-system ping-pong suppression as described in the above embodiments.

Embodiments of the present application provide a computer program product or computer program, which includes computer instructions stored in a computer-readable storage medium. The processor of the computer device reads the computer instruction from the computer-readable storage medium, and the processor executes the computer instruction, so that the computer device executes the method for inter-system ping-pong suppression provided in the above aspect.

Those skilled in the art should realize that in one or more of the above examples, the functions described in the embodiments of the present application can be realized by hardware, software, firmware or any combination thereof. When implemented in software, these functions can be stored in a computer-readable medium or transmitted as one or more instructions or codes on a computer-readable medium. Computer-readable media include computer storage media and communication media, where communication media includes any media that facilitates the transfer of computer programs from one place to another. The storage medium can be any available medium that can be accessed by a general-purpose or special-purpose computer.

The above is only an optional embodiment of this application, and it is not used to limit this application. Any modification, equivalent substitution, improvement, etc. made within the spirit and principle of this application should be included in the protection scope of this application.

The invention claimed is:

1. A method for inter-system ping-pong suppression, comprising:

obtaining a network standard sequence within a predetermined time, wherein the network standard sequence consists of recorded network standards adopted by a cell after each handover of a resident cell of a terminal device;

determining that the terminal device is in an inter-system ping-pong state, in response to determining according to the network standard sequence that handover times of network standards reach a threshold number and adjacent network standards in the network standard sequence differ;

determining a target network standard in at least two network standards when the terminal device is in the inter-system ping-pong state, wherein the inter-system ping-pong state refers to a state that the terminal device repeatedly switches between cells of at least two network standards;

once the terminal device resides in a target cell after determining the target network standard, updating a number of inter-system ping-pong state rounds, setting a time duration of a timer according to the number of inter-system ping-pong state rounds, and starting the timer;

wherein the number of inter-system ping-pong state rounds represents a number of occurrences of the inter-system ping-pong state, and the timer duration is positively correlated with the number of inter-system ping-pong state rounds; and closing a network capability of the terminal device in other network standards, wherein the other network standards are the network standards other than the target network standard among at least two network standards.

2. The method of claim 1, wherein the method further comprises restoring the network capability in the other network standards when the timer reaches the timer duration.

3. The method of claim 1, wherein after closing the network capability in the other network standards, the method further comprises:

restoring the network capability in the other network standards in the timer duration of the timer, when a signal strength of the target cell is less than a signal strength threshold, or displacement of the terminal device is greater than a displacement threshold.

4. The method of claim 1, wherein the terminal device turns on a stand-alone (SA) capability of 5G;

wherein determining a target network standard in at least two network standards when the terminal device is in inter-system ping-pong state comprises determining that the terminal device is in the inter-system ping-pong state when the terminal device repeatedly switches between cells of a 5G network and a 4G network, and determining the target network standard is 4G; and wherein closing the network capability of the terminal device in other network standards comprises closing the 5G SA capability when the terminal device resides in a 4G cell.

5. The method of claim 1, wherein the timer duration is exponentially correlated with the number of inter-system ping-pong state rounds.

6. The method of claim 1, wherein the time duration of the timer is less than an upper limit of a timer duration.

7. The method of claim 1, wherein after closing the network capability in the other network standards, the method further comprises:

adding a target cell identifier to a forbidden list, wherein the forbidden list is used for storing cell identifiers of cells with inter-system ping-pong state problem; and restoring the network capability in the other network standards when a resident cell of the terminal device is switched and cell identifier of the switched cell does not belong to the forbidden list.

8. The method of claim 7, wherein the method further comprises:

removing the target cell identifier from the forbidden list when a removal condition is met, and the removal condition includes at least one of: the terminal device accessing the network again; and an adding time of the target cell identifier reaches a time threshold.

9. The method of claim 7, wherein before determining a target network standard in at least two network standards when the terminal device is in inter-system ping-pong state, the method further comprises:

obtaining cell identifier of the switched cell when the resident cell of the terminal device is switched; and recording the network standard adopted by the switched cell when the identifier of the switched cell does not belong to the forbidden list, and the forbidden list contains the cell identifier of the cell with inter-system ping-pong state problem.

10. The method of claim 9, wherein after closing the 5G SA capability, the method further comprises:

sending a TAU request to a network device, wherein a value of a preset field in the TAU request is a first numerical value, and the first numerical value is used for indicating the close of the 5G SA capability of the terminal device, and the network device is used for updating the network capability of the terminal device according to the TAU request.

11. A terminal device, comprising:

one or more processors; and a memory configured to store instructions which, when executed by the one or more processors, cause the one or more processors to:

obtain a network standard sequence within a predetermined time, wherein the network standard sequence consists of recorded network standards adopted by a cell after each handover of a resident cell of a terminal device;

determine that the terminal device is in an inter-system ping-pong state, in response to determining according to the network standard sequence that handover times of network standards reach a threshold number and adjacent network standards in the network standard sequence differ;

determine a target network standard in at least two network standards when the terminal device is in the inter-system ping-pong state, wherein the inter-system ping-pong state refers to a state that the terminal device repeatedly switches between cells of at least two network standards;

once the terminal device resides in a target cell after determining the target network standard, update a number of inter-system ping-pong state rounds, set a time duration of a timer according to the number of inter-system ping-pong state rounds, and start the timer;

wherein the number of inter-system ping-pong state rounds represents a number of occurrences of the inter-system ping-pong state, and the timer duration is positively correlated with the number of inter-system ping-pong state rounds; and close a network capability of the terminal device in other network standards, wherein the other network standards are the network standards other than the target network standard among at least two network standards.

12. The terminal device of claim 11, wherein the processor is further caused to restore the network capability in the other network standards when the timer reaches the timer duration.

13. The terminal device of claim 11, wherein after closing the network capability in the other network standards, the instructions further cause the one or more processors to:

restore the network capability in the other network standards in the timer duration of the timer, when a signal strength of the target cell is less than a signal strength threshold, or displacement of the terminal device is greater than a displacement threshold.

14. The terminal device of claim 11, wherein the terminal device turns on a stand-alone (SA) capability of 5G;

wherein determining the target network standard in at least two network standards when the terminal device is in inter-system ping-pong state comprises:

determine the terminal device is in the inter-system ping-pong state when the terminal device repeatedly switches between cells of a 5G network and a 4G network, and determining the target network standard is 4G; and wherein closing the network capability of the terminal device in other network standards comprises:

close the 5G SA capability when the terminal device resides in a 4G cell.

15. The terminal device of claim 14, wherein after closing the 5G SA capability, the instructions further cause the one or more processors to:

send a TAU request to a network device, wherein a value of a preset field in the TAU request is a first numerical value, and the first numerical value is used for indicating the close of the 5G SA capability of the terminal device, and the network device is used for updating the network capability of the terminal device according to the TAU request.

16. The terminal device of claim 11, wherein after closing the network capability in the other network standards, the instructions further cause the one or more processors to:

add a target cell identifier to a forbidden list, wherein the forbidden list is used for storing cell identifiers of cells with inter-system ping-pong state problem; and restore the network capability in the other network standards when a resident cell of the terminal device is switched and cell identifier of the switched cell does not belong to the forbidden list.

17. The terminal device of claim 16, wherein before determining the target network standard in at least two network standards when the terminal device is in inter-system ping-pong state, the instructions further cause the one or more processors to:

obtain a cell identifier of the switched cell when the resident cell of the terminal device is switched; and record the network standard adopted by the switched cell when the identifier of the switched cell does not belong to the forbidden list, and the forbidden list contains the cell identifier of the cell with inter-system ping-pong state problem.

18. A non-transitory computer-readable storage medium having at least one instruction stored thereon, which when executed by a processor of a terminal device, causes the processor to:

obtain a network standard sequence within a predetermined time, wherein the network standard sequence consists of recorded network standards adopted by a cell after each handover of a resident cell of a terminal device;

determine that the terminal device is in an inter-system ping-pong state, in response to determining according to the network standard sequence that handover times of network standards reach a threshold number and adjacent network standards in the network standard sequence differ;

determine a target network standard in at least two network standards when the terminal device is in the inter-system ping-pong state, wherein the inter-system ping-pong state refers to a state that the terminal device repeatedly switches between cells of at least two network standards;

once the terminal device resides in a target cell after determining the target network standard, update a number of inter-system ping-pong state rounds, set a time duration of a timer according to the number of inter-system ping-pong state rounds, and start the timer;

wherein the number of inter-system ping-pong state rounds represents a number of occurrences of the inter-system ping-pong state, the timer duration is positively correlated with the number of inter-system ping-pong state rounds; and close a network capability of the terminal device in other network standards, wherein the other network standards are the network standards other than the target network standard among at least two network standards.

19. The non-transitory computer-readable storage medium of claim 18, wherein the method further comprises restoring the network capability in the other network standards when the timer reaches the timer duration.

* * * * *